(12) United States Patent
Kilpatrick et al.

(10) Patent No.: US 6,882,079 B2
(45) Date of Patent: Apr. 19, 2005

(54) LOW MASS GENERATOR WEDGE AND METHODS OF USING SAME

(75) Inventors: Neil Leslie Kilpatrick, Winter Springs, FL (US); Kevin M. Light, Maitland, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/965,570

(22) Filed: Sep. 27, 2001

(65) Prior Publication Data

US 2003/0057794 A1 Mar. 27, 2003

(51) Int. Cl.[7] .................................................. H02K 3/48
(52) U.S. Cl. ...................................... 310/214; 310/261
(58) Field of Search .............................. 310/216, 217, 310/218, 254, 215, 214

(56) References Cited

U.S. PATENT DOCUMENTS

| | | | | |
|---|---|---|---|---|
| 525,877 | A | * 9/1894 | Wardwell | 292/352 |
| 1,227,414 | A | * 5/1917 | Field | 310/214 |
| 4,425,521 | A | * 1/1984 | Rosenberry et al. | 310/214 |
| 4,469,971 | A | * 9/1984 | Moore | 310/214 |
| 4,667,125 | A | * 5/1987 | Kaminski et al. | 310/214 |
| 4,710,663 | A | * 12/1987 | Reid | 310/214 |
| 4,827,597 | A | * 5/1989 | Hein et al. | 29/596 |
| 4,857,788 | A | * 8/1989 | Hein et al. | 310/214 |
| 5,027,500 | A | 7/1991 | Keck et al. | 29/598 |
| 5,048,177 | A | 9/1991 | Keck et al. | 29/734 |
| 5,075,959 | A | 12/1991 | Keck et al. | 29/734 |
| 5,382,860 | A | * 1/1995 | Fanning et al. | 310/216 |
| 5,430,340 | A | 7/1995 | Shih et al. | 310/214 |
| 5,459,363 | A | * 10/1995 | Miyakawa et al. | 310/214 |
| 5,528,097 | A | * 6/1996 | Gardner et al. | 310/270 |
| 5,550,417 | A | * 8/1996 | Morrison et al. | 310/183 |
| 6,140,733 | A | * 10/2000 | Wedde et al. | 310/196 |
| 6,218,756 | B1 | 4/2001 | Gardner et al. | 310/214 |
| 6,225,725 | B1 | * 5/2001 | Itoh et al. | 310/254 |
| 6,279,420 | B1 | 8/2001 | Knorowski et al. | 74/573 |
| 6,316,852 | B1 | * 11/2001 | Semba et al. | 310/61 |

FOREIGN PATENT DOCUMENTS

| | | | | |
|---|---|---|---|---|
| JP | 0298739 | * | 7/1988 | H02K/3/48 |
| JP | 03015239 | * | 1/1991 | H02K/3/487 |
| WO | WO8904078 | * | 5/1989 | H02K/1/06 |

* cited by examiner

*Primary Examiner*—Darren Schuberg
*Assistant Examiner*—Heba Elkassabgi

(57) ABSTRACT

A wedge (40) and methods of using the wedge (40) for a power generator (30) are provided. The wedge (40) preferably has a wedge body (41) and at least one substantially hollow cavity (45) formed in the wedge body (41) so that the at least one hollow cavity (45) is substantially evenly distributed about a neutral axis of stress applied to the wedge body (41) when in use and so that the neutral axis of stress of the wedge body (41) having the hollow cavity (45) is substantially the same neutral axis of stress of a wedge body (41) having substantially the same shape as the wedge body (41) without a hollow cavity. A method of using a wedge (40) preferably includes increasing the mass of the contents of a slot (35) of a power generator (30) and positioning a wedge (40) having at least one longitudinally extending and substantially hollow cavity (45) formed therein and extending throughout major portions of the wedge (40) to overlie the slot (35) and retain the slot contents therein.

15 Claims, 7 Drawing Sheets

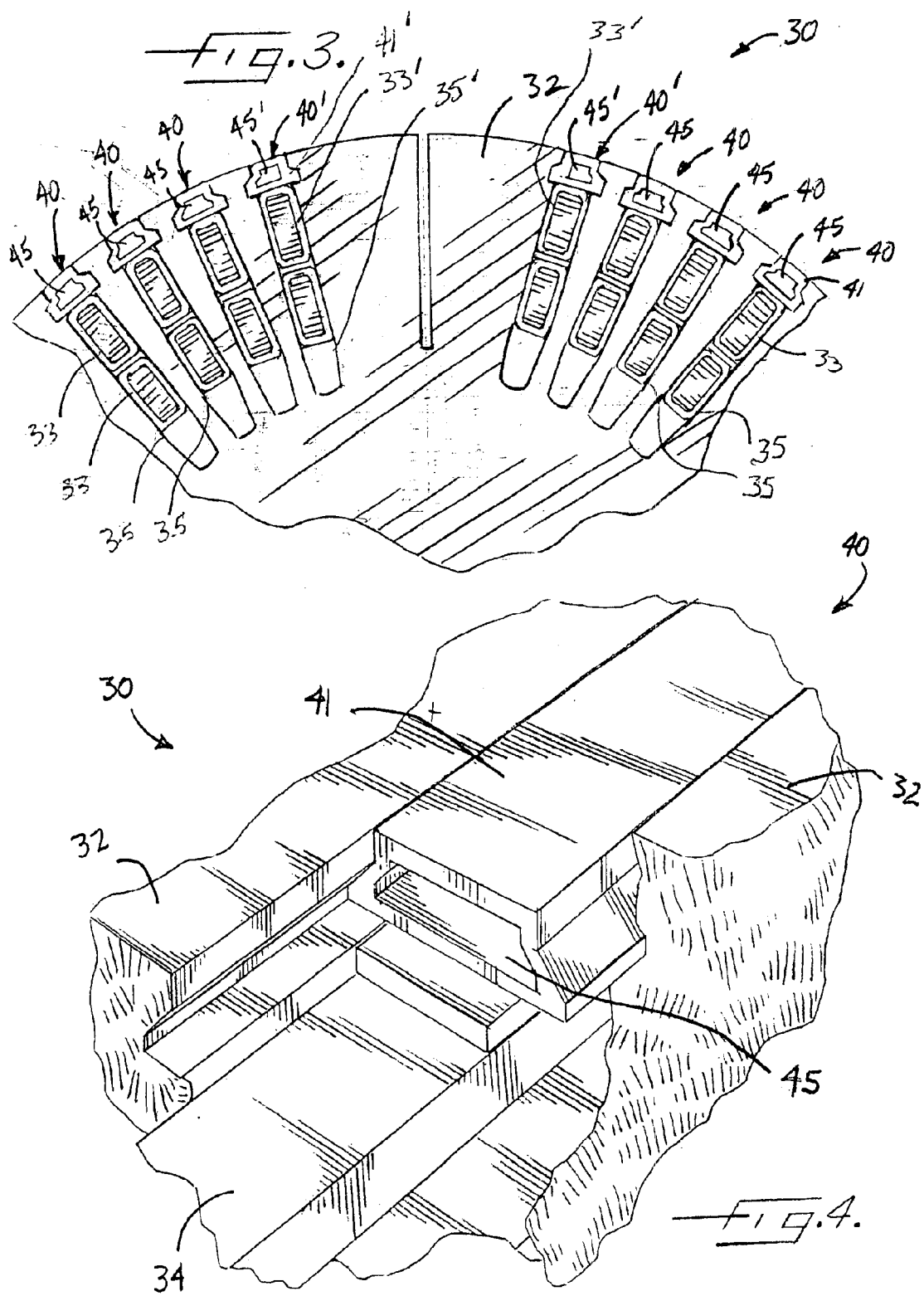

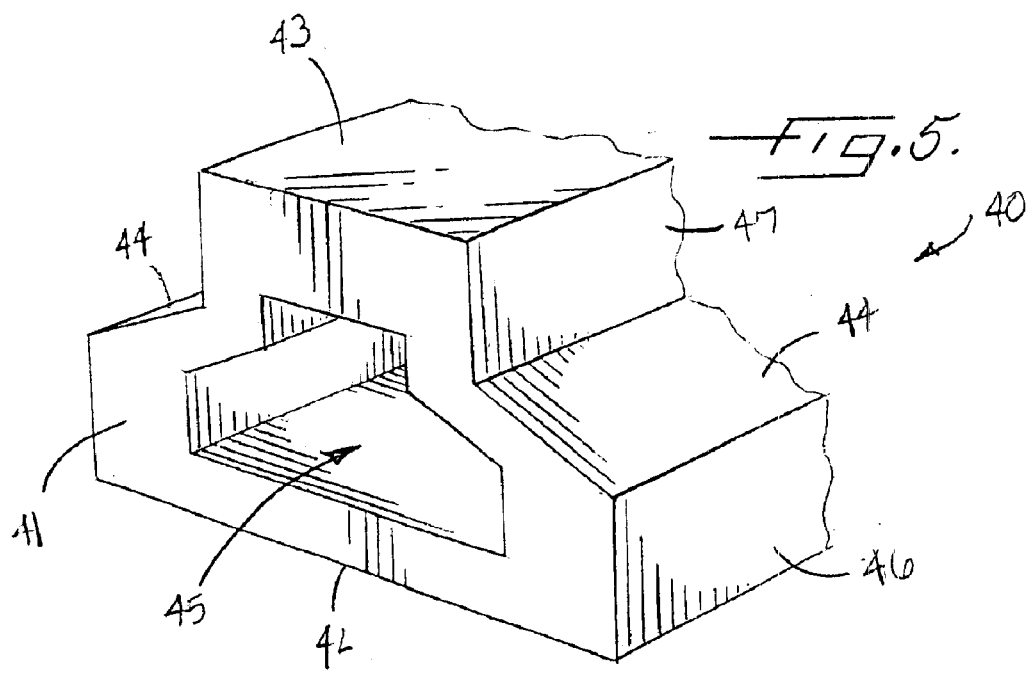
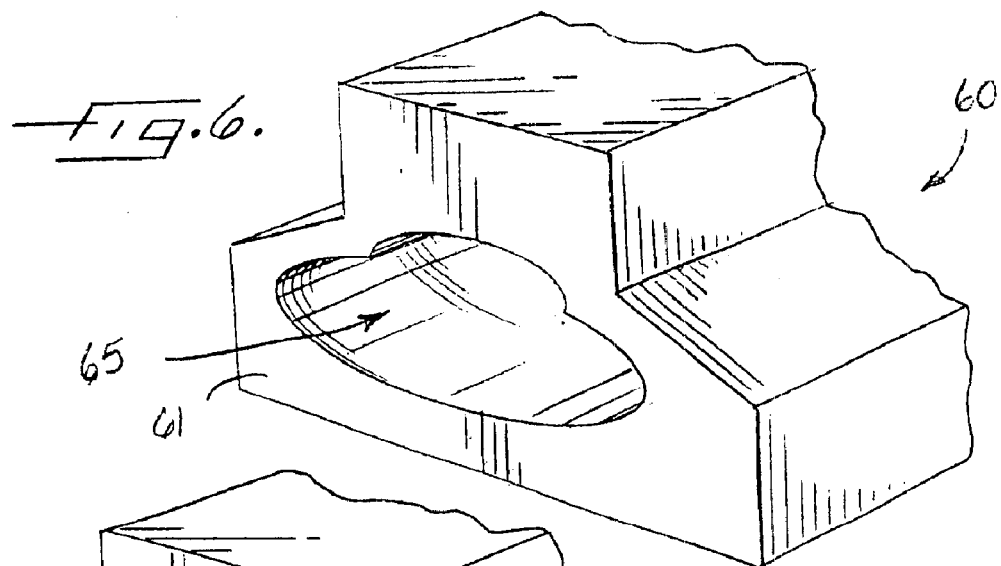
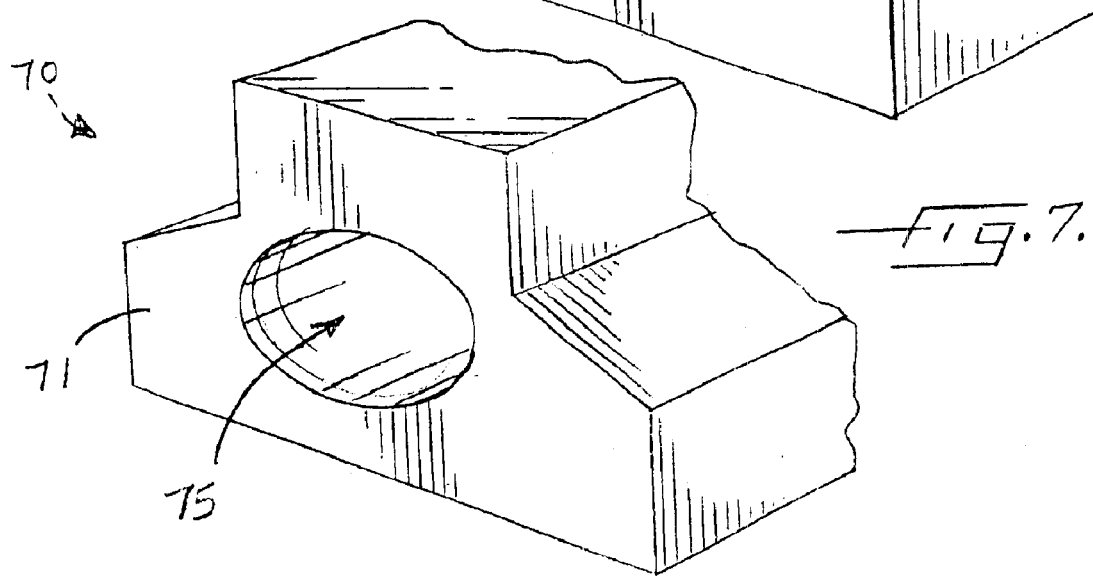

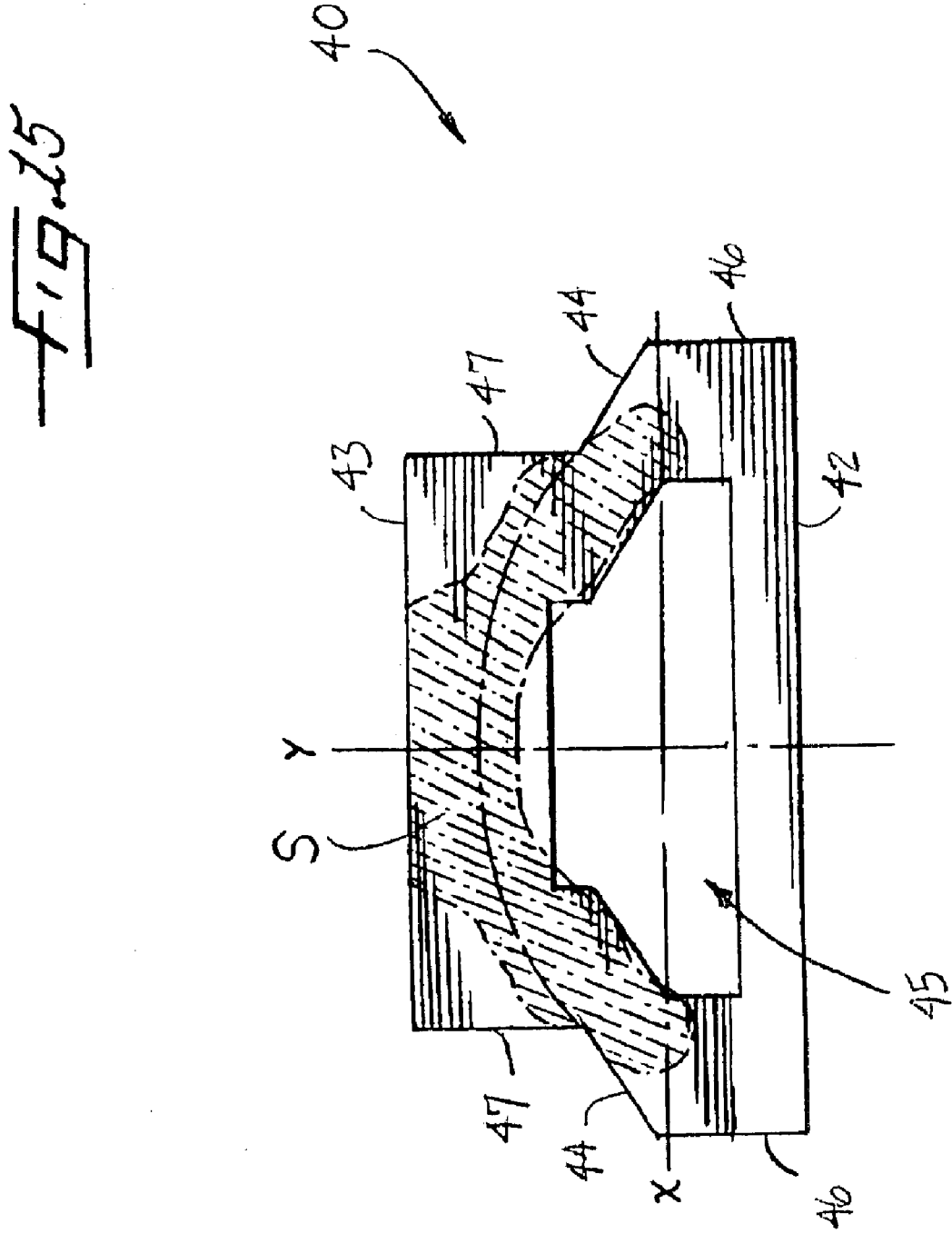

LOW MASS GENERATOR WEDGE AND METHODS OF USING SAME

FIELD OF THE INVENTION

This invention is related to the power generation industry and, more particularly, to the field of power generators.

BACKGROUND OF THE INVENTION

Conventional power generators generate electrical energy by means of induction. Such generators employ a stator core along with a rotor shaft having rotor coils associated therewith to rotate within the stator core in order to convert mechanical energy into electrical energy. The generator rotor conventionally includes a plurality of spaced-apart rotor slots often formed in and extending inwardly from outer peripheries of the rotor, e.g., the rotor body. The rotor slots conventionally have a plurality of electrically-conductive rotor wedges which hold the slot contents, e.g., coils, slot filler, insulating materials, within the slots.

These rotor wedges can have a wide variety of shapes, e.g., a top hat type configuration such as shown in prior art FIG. 1, a Christmas tree type configuration, a dovetail type configuration, or other configurations as understood by those skilled in the art. These shapes often correspond to a mating relationship with grooves or channels formed in opposing side walls of a slot and the upper opening of the slot. Also, these rotor wedges often have a plurality of spaced-apart vertically extending (or rotationally extending when the rotor wedge is positioned within a slot) vent holes formed in and extending through the rotor wedges. Examples of rotor wedges with such vent holes can be seen in U.S. Pat. No. 5,048,177 by Keck et al. titled "*Generator Rotor Slot Wedge Tool*," U.S. Pat. No. 5,027,500 by Keck et al. titled "*Generator Rotor Slot Wedge Assembly And Disassembly*," and U.S. Pat. No. 5,075,959 by Keck et al. titled "*Generator Rotor Slot Wedge Assembly And Disassembly Fixture*." Further, rotor wedges also often have vertically or rotationally extending openings, e.g., for fasteners, formed therein for tightening such wedges such as shown in U.S. Pat. No. 6,218,756 by Gardner et al. titled "*Generator Rotor Slot Tightening Method and Associated Apparatus*."

Despite the significant improvement in slot tightening techniques with conventional rotor wedges, there is still a need for power generator efficiency and power output enhancements from the generator, and particularly from the rotor. Accordingly, the burden that the rotor wedges must carry in retaining the contents of the slot includes the mass of the contents of the slot and the rotor wedge itself. For a given slot-wedge configuration, the total burden can be stated as:

$B$=Mass(wedge+slot contents)

where B is the total burden. This total burden, however, can reduce or be a limitation on the output from and efficiency of the rotor of a power generator based on the rating, size, and type of rotor.

SUMMARY OF THE INVENTION

With the foregoing in mind, the present invention advantageously provides a power generator having a low mass rotor wedge to increase output of the rotor of a power generator and methods of using a wedge to increase power output from a generator. The present invention also advantageously provides a wedge for a power generator which has a substantially reduced mass and is relatively easy to manufacture with little or no decrease in the strength of the wedge. By substantially preserving the strength of the wedge for power generator applications, such as a rotor, the amount of mass reduction can be used to increase the coil size and/or characteristics to thereby enhance power output. For example, when used with a generator rotor, if the wedge strength is held constant, then the total burden that is carried by the wedge is held constant. If material is then removed from the wedge, then the mass of the wedge is reduced, and the mass of the coils and insulation materials can be increased by the mass of the material removed from the wedge. This, therefore, can significantly increase the output of the generator rotor.

More particularly, a power generator according to the present invention preferably has a stator and a rotor positioned adjacent the stator. The rotor preferably has a plurality of slots formed therein or associated therewith. A plurality of rotor coils are each positioned within a respective one of the plurality of slots. A plurality of rotor wedges are preferably each positioned to retain a respective one of the plurality of rotor coils positioned within a corresponding respective one of the plurality of slots. Each of the plurality of rotor wedges preferably has a wedge body and at least one substantially hollow cavity formed in the wedge body so that the at least one hollow cavity is substantially evenly distributed about a neutral axis of stress applied to the wedge body when in use and so that the neutral axis of stress of the wedge body having the hollow cavity is substantially the same neutral axis of stress of a wedge body having substantially the same shape as the wedge body without the hollow cavity.

For example, according to the present invention, the at least one substantially hollow cavity can advantageously longitudinally extend into or through the hollow cavity along major portions of the wedge body. The at least one hollow cavity can be one or a plurality of similar or different sized cavities extending in the wedge body. Alternatively, instead of longitudinally extending through the wedge body or in addition to a hollow cavity that longitudinally extends into a wedge body, one or more hollow cavities can laterally or transversely extend through the wedge body. With each of these embodiments of the hollow cavity or cavities, however, it will be understood by those skilled in the art that the hollow cavity or cavities preferably are substantially evenly distributed about a neutral axis of stress applied to the wedge body when in operation, e.g., when positioned in a rotor and being operated.

According to another aspect of the present invention, a rotor wedge for a power generator is provided which preferably has a wedge body and at least one substantially hollow cavity longitudinally extending through major portions of the wedge body so that the at least one hollow cavity is substantially evenly distributed about the neutral axis of stress applied to the wedge body when in use and so that the neutral axis of stress of the wedge body having the hollow cavity is substantially the same neutral axis of stress of a wedge body having substantially the same shape as the wedge body without a hollow cavity.

The present invention also advantageously provides a method of using a wedge for a power generator. The method preferably includes increasing the mass of the contents of a slot of a power generator and positioning a wedge having at least one substantially hollow cavity formed therein and longitudinally extending through portions thereof to overlie the contents of the slot and retain the slot contents therein. The increased mass of the contents of the slot is preferably an increase by an amount substantially equal to or less than the mass required to fill the substantially hollow cavity. The method can further include increasing the power output of the power generator responsive to the increased mass of the contents of the slot during operation of the power generator.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 3 is a fragmentary side plan view of a power generator having a low mass generator wedge according to the present invention;

FIG. 4 is a fragmentary perspective view of a power generator having a low mass generator wedge according to the present invention;

FIG. 5 is a fragmentary perspective view of a low mass generator wedge according to a first embodiment of the present invention;

FIG. 6 is a fragmentary perspective view of a low mass generator wedge according to a second embodiment of the present invention;

FIG. 7 is a fragmentary perspective view of a low mass generator wedge according to a third embodiment of the present invention;

FIG. 11 is a fragmentary perspective view of a low mass generator wedge according to a seventh embodiment of the present invention;

FIG. 12 is a fragmentary perspective view of a low mass generator wedge according to an eighth embodiment of the present invention;

FIG. 13 is a fragmentary perspective view of a low mass generator wedge according to a ninth embodiment of the present invention;

FIG. 15 is a front plan view of a rotor wedge according to the first embodiment of the present invention having neutral axis stress regions illustrated with phantom lines for clarity.

DETAILED DESCRIPTION

Figure 1:
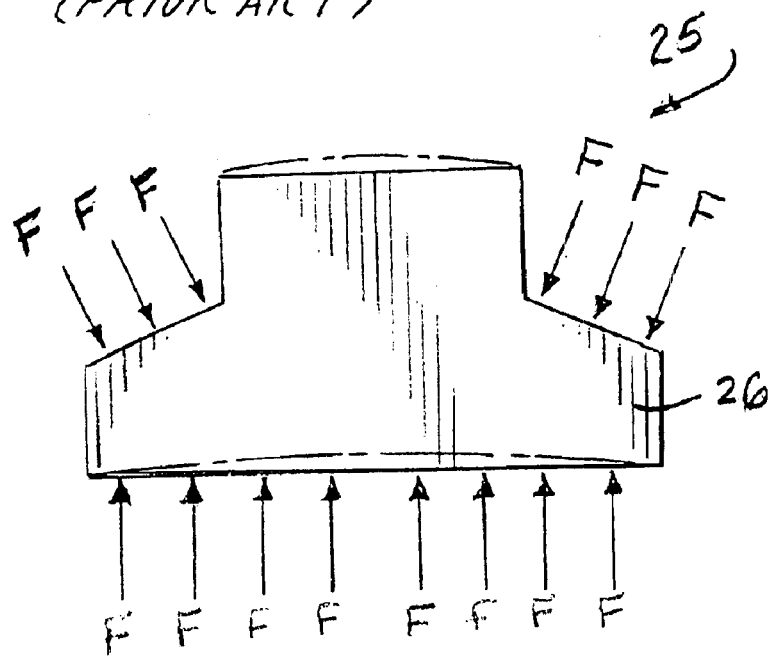
FIG. 1 is a side plan view of a prior art rotor wedge illustrating by arrows forces being applied to the rotor wedge during use.

The present invention will now be described more fully hereinafter with reference to the accompanying drawings which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, the prime notation, if used, indicates similar elements in alternative embodiments.

As perhaps best shown in FIGS. 3–4, a power generator 30 according to the present invention preferably has a stator (not shown) and a rotor 32 positioned adjacent the stator. As understood by those skilled in the art, the stator has a stator core, and the rotor 32 has a rotor shaft positioned to rotate within the stator core and preferably has an axial lead extending axially through a portion of the rotor shaft to provide a conductive path therethrough (not shown). The rotor 32 preferably has a plurality of spaced-apart rotor slots 35 often formed in and extending inwardly from outer peripheries of the rotor body of the rotor 32. The present invention, however, is also applicable to other rotor configurations as well as the configuration shown in FIGS. 3–4 as understood by those skilled in the art.

A plurality of a rotor coils 33, 33' preferably are each positioned within a respective one of the plurality of slots 35, 35' to provide a conductive path for induced electrical current. Other slot contents, such as insulation or filler materials 34, are preferably positioned within the slots as well. A plurality of rotor wedges 40, 40' are preferably each positioned to retain the respective one of the plurality of rotor coils 33 within a corresponding respective one of the plurality of slots 35. Each of the plurality of rotor wedges 40, 40' preferably has a wedge body 41, 41' and at least one substantially hollow cavity 45, 45' longitudinally extending through and formed in the wedge body 41, 41', e.g., extending through major portions thereof, so that the at least one hollow cavity 45, 45' is substantially evenly distributed about a neutral axis of stress applied against the wedge body 41 when in or during use (see FIG. 15) and so that the neutral axis x, y of stress s of the wedge body 41 having the hollow cavity 45 of the wedge body is substantially the same neutral axis x, y of stress s of the wedge body 26 during use having substantially the same shape as the wedge body 41 without the hollow cavity 45 such as shown in the prior art of FIG. 1.

The hollow cavity of the wedge 40 of the present invention is preferably longitudinally extending as distinguished between known vent holes or openings which are vertically extending downwardly through the wedge 25 of the prior art FIG. 1 as understood by those skilled in the art or other vertical or lateral openings in the wedge body. As understood by those skilled in the art, a rotor wedge 40 according to the present invention can have a wide variety of shapes besides the top hat type shape illustrated. For example, the rotor wedge 40 can have a Christmas tree type configuration as well, e.g., a wedge body and a plurality of fin-type or arm-type members connected to and extending outwardly and downwardly from the wedge body 41 to be inserted into grooves formed in the side walls of the slots, a dovetail type configuration, or other configurations as understood by those skilled in the art.

Additionally, for example, according to the present invention, the at least one substantially hollow cavity can advantageously longitudinally extend into or through the hollow cavity along major portions of the wedge body 41 as shown in the drawings throughout. The at least one hollow cavity 45 can be one or a plurality of similar or different sized cavities extending in the wedge body 41 (see FIG. 13). Alternatively, instead of longitudinally extending through the wedge body 41 or in addition to a hollow cavity 45 that longitudinally extends into a wedge body 41, one or more hollow cavities 45, 45' can laterally or transversely extend through the wedge body 41. With each of these embodiments of the hollow cavity 45 or cavities, however, it will be understood by those skilled in the art that the hollow cavity 45 or cavities 45, 45' preferably are substantially evenly distributed about a neutral axis of stress applied to the wedge body 41 when in operation, e.g., when positioned in a rotor 32 and being operated. Further, as another alternative, instead of the cavities of the rotor wedge 40 being void or hollow, these cavities can also be filled with a lighter weight or lower mass material such as a glass type material to also increase power output and/or power efficiency of a rotor 32.

As perhaps best shown in FIGS. 2–3 and 5–15, the hollow cavity 45 preferably is positioned substantially within the outer peripheries of the wedge body 41. In these embodiments of the wedge 40, 60, 70, 80, 90, 100, 110, 120, 130, it is notable that the neutral axis of stress applied to the wedge body 41 as understood by those skilled in the art passes or extends through the hollow cavity 45, 65, 75, 85, 95, 105, 115, 125, 135. These embodiments also illustrate that the hollow cavity or cavities formed in the respective wedge bodies 41, 61, 71, 81, 91, 101, 111, 121, 131 can have various shapes as well. Notably, the wedge 40' of the rotor 32 preferably has a different shaped hollow cavity 45' in view of the stress forces being applied to this wedge 40' and is significantly different than the forces applied to each of the other wedges 40 of the rotor 32. Accordingly, these shapes of the cavities 45' are still substantially evenly distributed about the neutral axis of stress as understood by those skilled in the art. It is just that the neutral axis of stress is different due to the location of the wedges 40' in the rotor 32.

Alternatively, as shown in FIG. 13, the at least one hollow cavity 45 can advantageously be a plurality, e.g., two or more, of longitudinally extending and substantially hollow cavities 135 substantially evenly distributed about the neutral axis x, y of stress s of the wedge body 131 during use so that the neutral axis of stress of the wedge body 131 during use having the plurality of hollow cavities 135 is substantially the same neutral axis of stress of a wedge body 26 having substantially the same shape as the wedge body 131 without the plurality of hollow cavities 135 (see FIG. 1). In this embodiment, the neutral axis x, y is preferably about where the center of the neutral axis, e.g., where a vertical axis y and a horizontal axis x intersect, is located.

Wedges can be formed of many materials, but, as illustrated, the wedge 40 is preferably formed of a metal material and may have an outer coating layer to enhance protection from abrasions, corrosion, or other potential damage to the wedge 40. The cavities 45 or holes are preferably substantially centralized within the wedge 40 and preferably extend longitudinally the length of the wedge body 41. The cavities 45 or holes, for example, can be formed by various machining techniques as understood by those skilled in the art such as extrusion, drawing, drilling, or other suitable methods. It will also be understood by those skilled in the art that the invention is primarily directed to rotor wedges because this is the location where the mass burden (B) becomes a significant issue, but other wedge uses in a power generation system where mass burden is an issue can be advantageously used as well. The hollow cavity 45 or cavities 125 are preferably centered within the wedge and preferably centered about the center of the neutral axis x, y of stress s so that the forces F (see FIG. 1) applied to outer peripheries of the wedge 40 are substantially offset to the same degree as if the wedge were substantially solid. As shown in FIG. 15, the stress region s substantially corresponds to the stress occurring within the wedge body 41 when forces F such as shown in FIG. 1 are applied to the wedge body 41 during use. The hollow cavity 45 is formed by mass removed from or the absence of mass in the wedge body 41 so that the stress region s has little or no change between the wedge 40 of the present invention and the wedge 25 of the prior art as shown in FIG. 1. Therefore, the strength of the wedge 40 should not be reduced at all or significantly little in view of the positioning of the cavity 45 or cavities 135 formed in the wedge 40.

The wedge 40 of the present invention preferably has an elongate and substantially rigid wedge body 41. The wedge body 41 in a top hat type configuration as illustrated, for example, preferably includes a substantially flat bottom surface 42 and a substantially flat top surface 43. As understood by those skilled in the art, however, various other sizes and shapes of rotor wedges can be used as well according to the present invention. The top surface 43 preferably has less surface area than the bottom surface 42 as illustrated, but other surface area configurations can be used as well according to the present invention.

Figure 2:
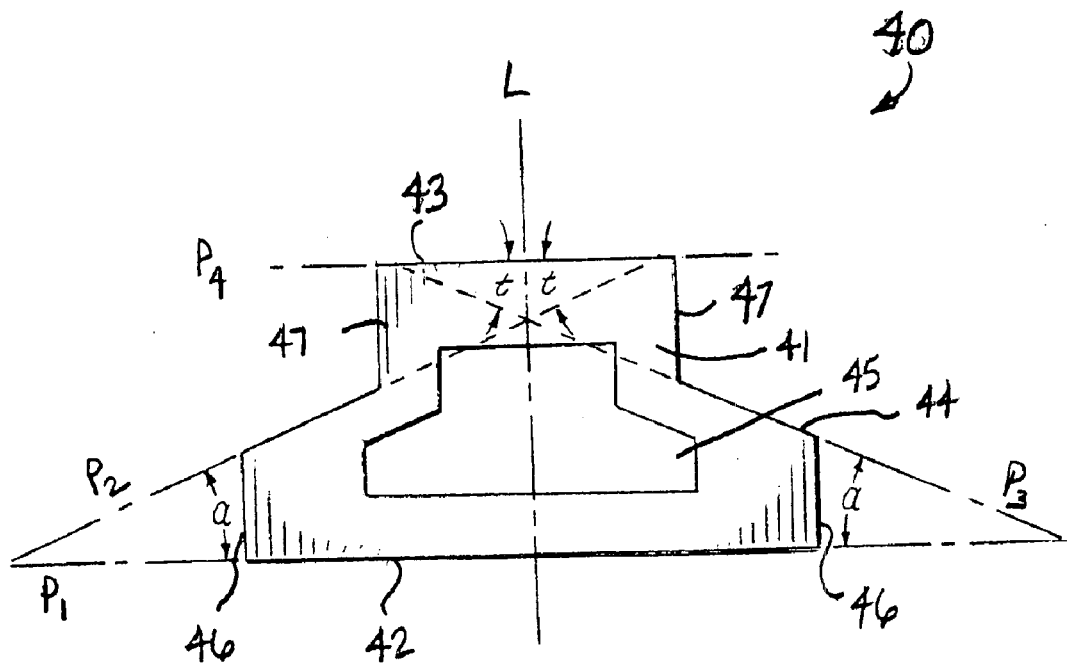
FIG. 2 is a side plan view of a low mass generator wedge according to a first embodiment of the present invention.
Figure 8:
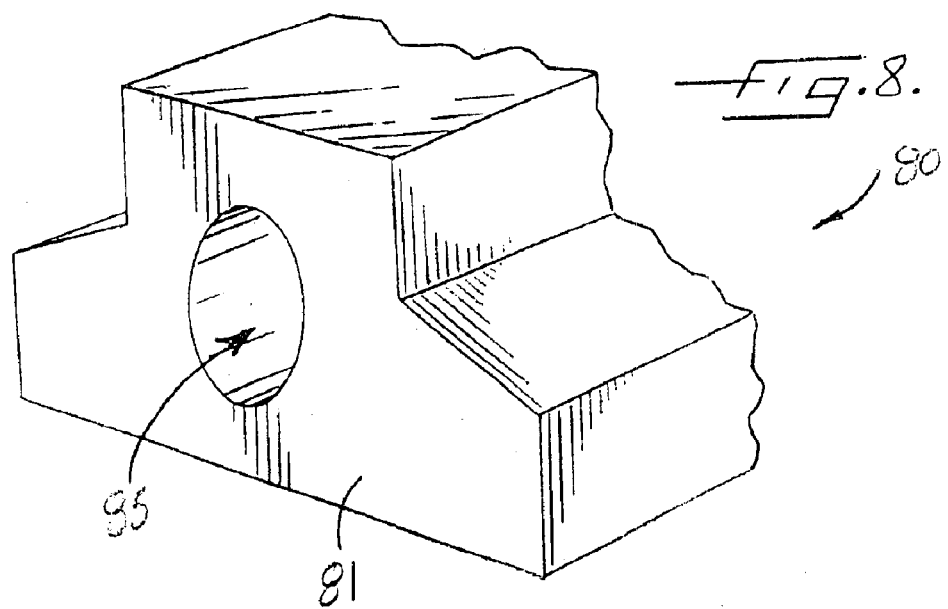
FIG. 8 is a fragmentary perspective view of a low mass generator wedge according to a fourth embodiment of the present invention.
Figure 9:
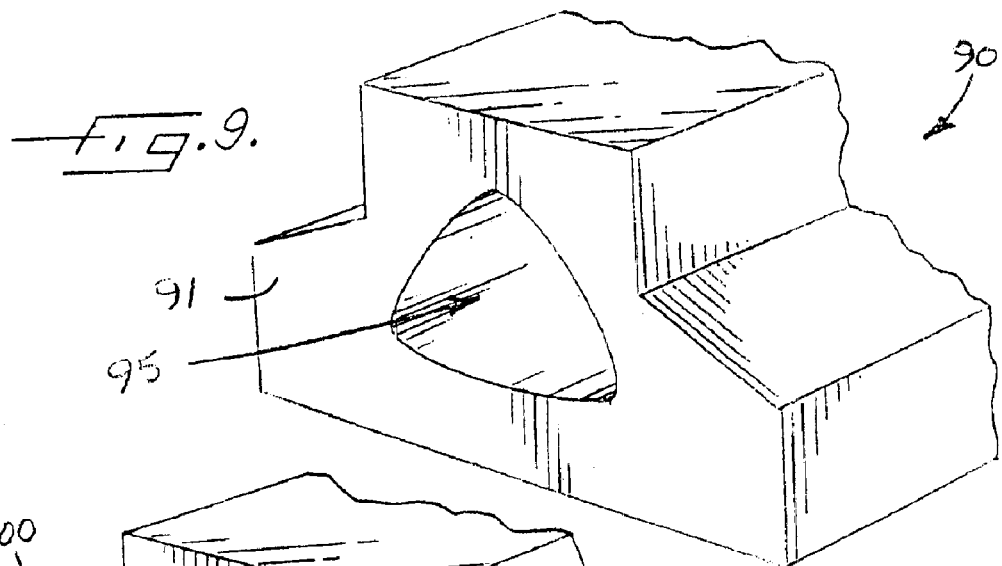
FIG. 9 is a fragmentary perspective view of a low mass generator wedge according to a fifth embodiment of the present invention.
Figure 10:
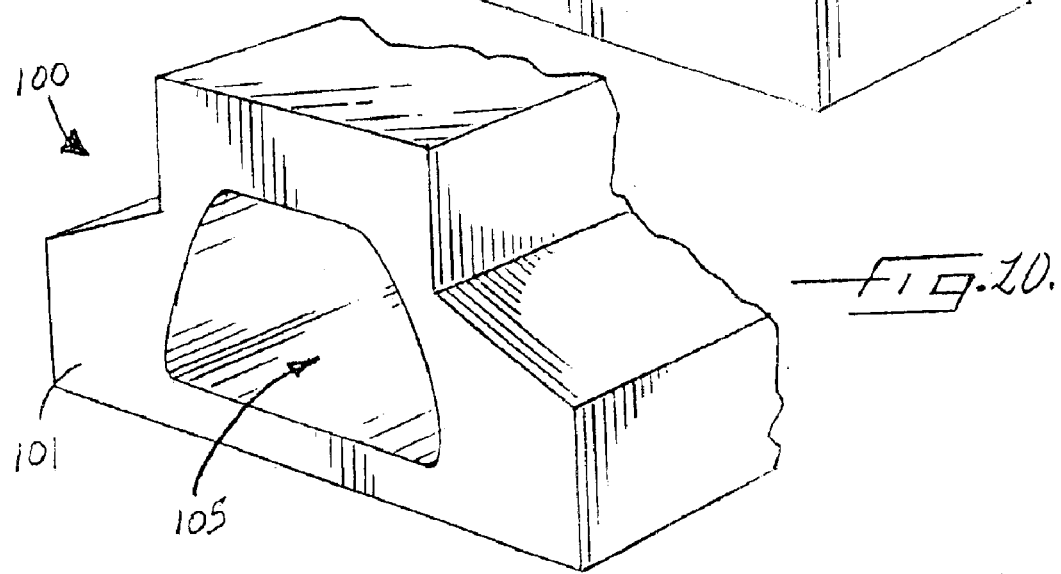
FIG. 10 is a fragmentary perspective view of a low mass generator wedge according to a sixth embodiment of the present invention.
Figure 22:
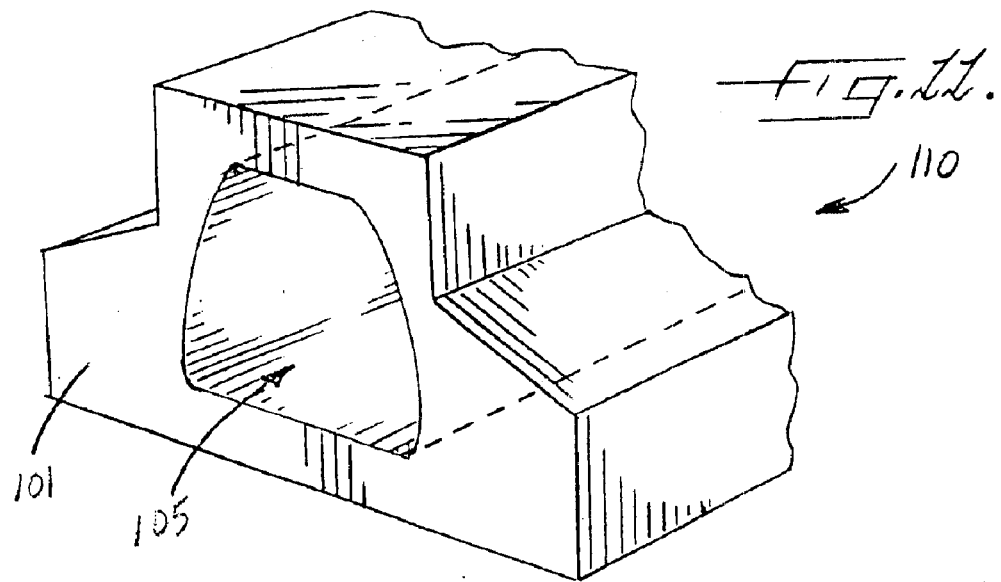
Figure 22:
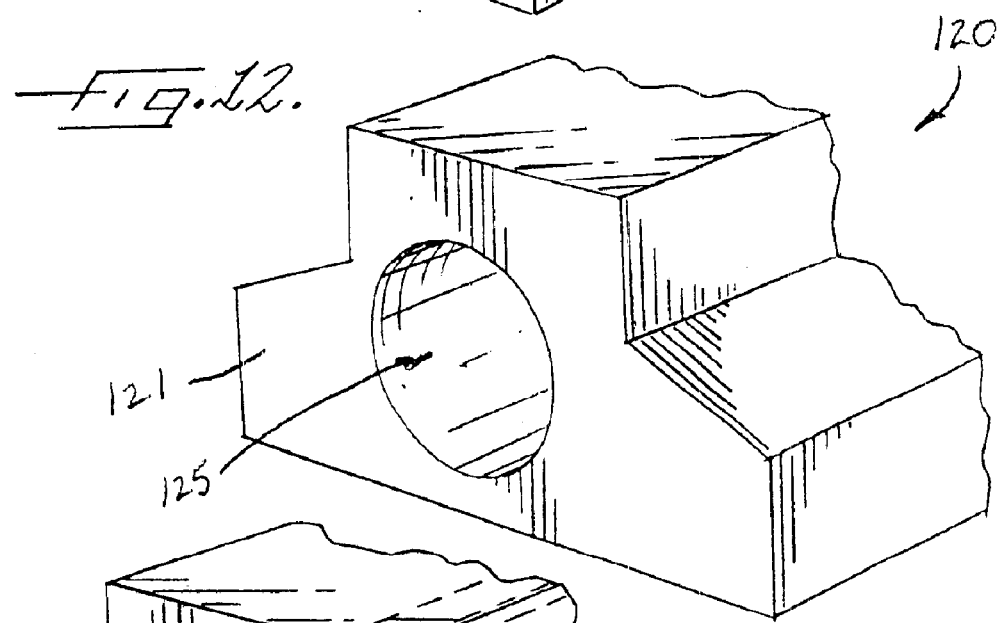
Figure 23:
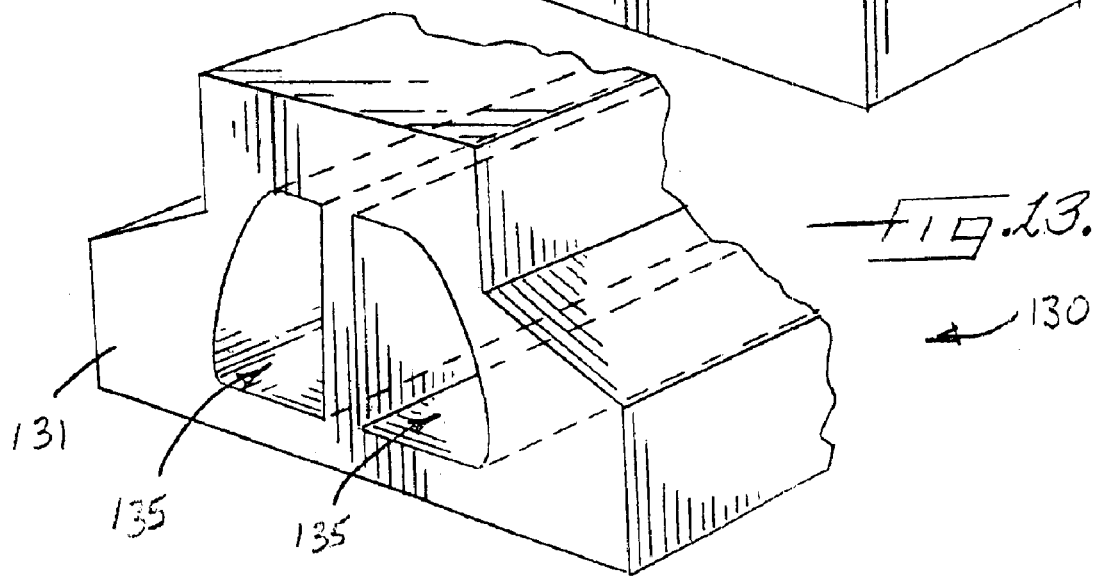
Figure 14:
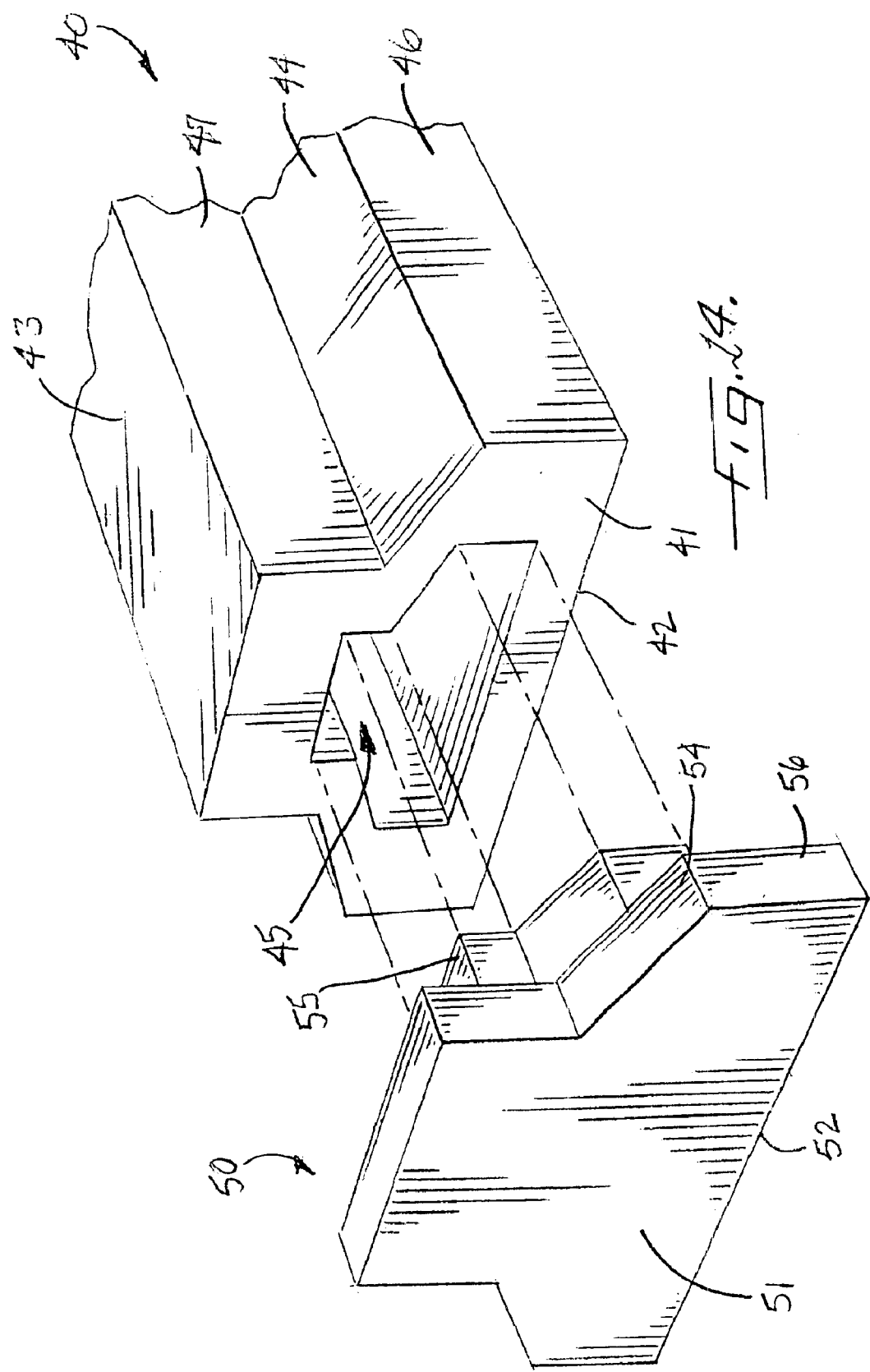
FIG. 14 is an exploded fragmentary perspective view of a low mass generator wedge having an end cap positioned within an end portion of the wedge according to a first embodiment of the present invention.

Also, according to another advantageous aspect of the present invention, an imaginary vertical center line L extending from the top surface 43 to the bottom surface 42 preferably divides the body 41 into two half portions which are substantially mirror images of each other, e.g., symmetrical about an axis. As shown in FIG. 2, the hollow cavity 45 also is centered about line L in this embodiment. Further, the substantially hollow cavity 41 or cavities 125 preferably extend throughout major portions of, and perhaps even more preferably throughout the substantial entire length of, the body 41. This allows more mass to be transferred to the slot contents and further enhances the output and efficiency of the rotor 32.

As perhaps best illustrated in FIG. 2, the wedge body 41 also preferably includes at least a pair of side peripheries 44 or side peripheral surfaces each sloping inwardly and upwardly from the plane of the extent of the substantially flat bottom surface 42 of the wedge body 41. The intersection of the plane of the extent of the bottom surface 42 and the plane of the inwardly and upwardly sloping of the pair of side peripheries 44 or peripheral surfaces define a predetermined angle $\alpha$, the predetermined angle $\alpha$ is preferably in the range of about 5 degrees to about 45 degrees, and perhaps more preferably in the range of about 10 to about 25 degrees. The plane of the sloping side peripheries 44 also intersects the plane of the extent of the top surface 43 at another predetermined angle t. As understood by those skilled in the art, the angle $\alpha$ plus the angle t are preferably substantially equal to ninety (90) degrees. In addition to the sloping side peripheries 44, the wedge body 41 also has substantially vertical lower 46 and upper 47 side peripheries as shown. Although the configuration of a wedge as shown has specific advantages such as fit, strength characteristics, and installation with conventional generator rotors, it will also be understood by those skilled in the art that various shapes and sizes of wedges can be used as well according to the present invention.

Further, the wedge 40 can be open ended as shown (see, e.g., FIGS. 3–4) or can have one or more end caps 50 to plug the cavity 45 as a separate portion of the wedge 40 (see FIG. 14) or as an integral part of the end of the wedge 40 during manufacture of the wedge 40. Such an end cap 50, for example, can be a type of seal that seals longitudinal flow of gas. Such an end cap 50 preferably has an end plug member 55 that substantially corresponds to the peripheral shape of the cavity 45 to fit therein, e.g., abuttingly contact peripheral walls of the cavity 45. Also, the end cap 50 can have a cap body 51 and peripherals, e.g., bottom 52, top 53, sides 54, 56, 57, which have a shape substantially the same as and correspond to the outer peripheries of the wedge body 41. In addition to or as an alternative to end caps 50 or other types and positions of seals for such a rotor wedge 40 of the present invention, a rotor wedge 40 according to the present invention can also have one or more barriers or seals positioned at various places along the length of the wedge 40 to form a barrier for or seal vent holes or other radially or vertically extending openings and to reduce audio noise and audio related forces, e.g., excitation forces, as understood by those skilled in the art.

As shown in FIGS. 1–15, and as described herein, the present invention also provides a method of using a wedge 40 for a power generator 30. The method preferably includes increasing the mass of the contents of a slot 35 of a power generator 30 and positioning a wedge 40 having at least one substantially hollow cavity 45 formed therein and longitudinally extending throughout major portions thereof to overlie the contents of the slot 35 and retain the slot contents therein. The increased mass of the contents of the slot 35 is preferably an increase by an amount substantially equal to or less than the mass required to fill the substantially hollow cavity 45. The method can further advantageously include increasing the power output of the power generator 30 responsive to the increased mass of the contents of the slot 35 during operation of the power generator 30, increasing the power efficiency of the power generator responsive to the increased mass of the contents of the slot during operation of the power generator, or a combination of increasing the power output and the power efficiency of the power generator responsive to the increased mass of the contents of the slot as understood by those skilled in the art. The efficiency, for example, can be a measurement of the relationship between the input and output as understood by those skilled in the art.

According to these method aspects of the present invention, the at least one substantially hollow cavity 45 formed in the wedge 40 is substantially evenly distributed about the neutral axis of stress applied to of the wedge 40 when in use so that the neutral axis of stress of the wedge 40 having the hollow cavity 45 is substantially the same neutral axis of stress of a wedge 26 having substantially the same shape as the wedge without the hollow cavity. The hollow cavity 45 is preferably substantially positioned within the outer peripheries of the wedge 40, and the wedge 40 preferably has an elongate and substantially rigid body 41. The body 41 preferably includes a substantially flat bottom surface 42 and a substantially flat top surface 43. The top surface 43 preferably has less surface area than the bottom surface 42. An imaginary vertical center line L extending from the top surface 43 to the bottom surface 42 preferably divides the body 41 into two half portions which are substantially mirror images of each other. Also, the at least one hollow cavity can include a plurality of longitudinally extending and substantially hollow cavities 125 substantially evenly distributed about the neutral axis of stress of the wedge 120 so that the neutral axis of stress of the wedge 120 having the plurality of hollow cavities 125 is substantially the same neutral axis of stress of a wedge 26 having substantially the same shape as the wedge without the plurality of hollow cavities (see FIG. 1).

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

What is claimed is:

1. A power generator comprising:
   a stator;
   a rotor positioned adjacent the stator, the rotor having a plurality of slots formed therein;
   a plurality of a rotor coils each positioned within a respective one of the plurality of slots; and
   a plurality of rotor wedges each positioned to retain a respective one of the plurality of rotor coils within the one respective one of the plurality of slots, each of the plurality of rotor wedges having a substantially solid wedge body and at least one substantially hollow cavity formed in the wedge body so that the at least one hollow cavity is substantially evenly distributed about a neutral axis of stress applied to the wedge body when in use and so that the neutral axis of stress of the wedge body having the hollow cavity is substantially the same neutral axis of stress of a wedge body having substantially the same shape as the wedge body without the hollow cavity.

2. A power generator as defined in claim 1, wherein the at least one hollow cavity extends through the wedge body and is positioned within the wedge body.

3. A power generator as defined in claim 1, wherein the at least one hollow cavity comprises a plurality of longitudinally extending and substantially hollow cavities substantially evenly distributed about the neutral axis of stress of the wedge body so that the neutral axis of stress of the wedge body having the plurality of hollow cavities is substantially the same neutral axis of stress of a wedge body having substantially the same shape as the wedge body without the plurality of hollow cavities.

4. A power generator as defined in claim 1, wherein wedge body is elongate and substantially rigid, wherein the wedge body includes a substantially flat bottom surface and a substantially flat top surface, the top surface having less surface area than the bottom surface, and wherein an imaginary vertical center line extending from the top surface to the bottom surface divides the wedge body into two half portions, the two half portions being substantially mirror images of each other.

5. A power generator as defined in claim 4, wherein the at least one hollow cavity extends through the wedge body and is positioned within the wedge body.

6. A power generator as defined in claim 1, wherein the body also includes at least a pair of side peripheries each sloping inwardly and upwardly from the plane of the extent of the substantially flat bottom surface of the wedge body.

7. A power generator as defined in claim 6, wherein the intersection of the plane of the extent of the bottom surface and the plane of the inwardly and upwardly sloping of the pair of side peripheries define a predetermined angle, the predetermined angle being in the range of about 5 degrees to about 45 degrees.

8. A rotor wedge for a power generator, the rotor wedge comprising a substantially solid wedge body and at least one substantially hollow cavity formed in the wedge body so that the at least one hollow cavity is substantially evenly distributed about a neutral axis of stress applied to the wedge body when in use and so that the neutral axis of stress of the wedge body having the hollow cavity is substantially the same neutral axis of stress of a wedge body having substantially the same shape as the wedge body without the hollow cavity.

9. A rotor wedge as defined in claim 8, wherein the at least one hollow cavity means extends through the wedge body and is positioned within the wedge body.

10. A rotor wedge as defined in claim 9, wherein the body also includes at least a pair of side peripheries each sloping inwardly and upwardly from the plane of the extent of the substantially flat bottom surface of the wedge body.

11. A rotor wedge as defined in claim 10, wherein the intersection of the plane of the extent of the bottom surface and the plane of the inwardly and upwardly sloping of the pair of side peripheries define a predetermined angle, the predetermined angle being in the range of about 5 degrees to about 45 degrees.

12. A rotor wedge as defined in claim 11, wherein the wedge body is formed of a metal material.

13. A rotor wedge as defined in claim 8, wherein the at least one hollow cavity means comprises a plurality of substantially hollow cavity means substantially evenly distributed about the neutral axis of stress of the wedge body so that the neutral axis of stress of the wedge body having the plurality of hollow cavity means is substantially the same neutral axis of stress of a wedge body having substantially the same shape as the wedge body without the plurality of hollow cavity means.

14. A rotor wedge as defined in claim 8, wherein wedge body is elongate and substantially rigid, wherein the wedge body includes a substatially flat bottom surface and a substantially flat top surface, the top surface having less surface area than the bottom surface, and wherein an imaginary vertical center line extending from the top surface to the bottom surface divides the body into two half portions, the two half portions being substantially mirror images of each other.

15. A rotor wedge as defined in claim 14, wherein the at least one hollow cavity means extends through the wedge body and is postioned within the wedge body.

* * * * *